(12) United States Patent
Ito

(10) Patent No.: US 8,294,930 B2
(45) Date of Patent: Oct. 23, 2012

(54) PRINTING SYSTEM, PORTABLE UNIT TERMINAL, SERVER, PORTABLE EMBEDDED PROGRAM AND SERVER PROGRAM

(75) Inventor: Chitoshi Ito, Kasugai (JP)

(73) Assignee: Brother Kogyo Kabushiki Kaisha, Nagoya-Shi, Aichi (JP)

( * ) Notice: Subject to any disclaimer, the term of this patent is extended or adjusted under 35 U.S.C. 154(b) by 1248 days.

(21) Appl. No.: 12/077,330

(22) Filed: Mar. 19, 2008

(65) Prior Publication Data

US 2008/0231897 A1  Sep. 25, 2008

(51) Int. Cl.
*G06F 3/12* (2006.01)
*G06K 15/00* (2006.01)

(52) U.S. Cl. ............... 358/1.15; 358/1.13; 358/1.14; 358/1.16; 358/1.1

(58) Field of Classification Search ........ 358/1.11–1.18; 345/738; 396/56
See application file for complete search history.

(56) References Cited

U.S. PATENT DOCUMENTS

| | | | |
|---|---|---|---|
| 6,999,637 B1* | 2/2006 | Anderson et al. | 382/311 |
| 7,207,735 B2* | 4/2007 | Narusawa et al. | 400/76 |
| 7,352,898 B2* | 4/2008 | Kitagawara et al. | 382/173 |
| 7,599,082 B2* | 10/2009 | Endo | 358/1.15 |
| 2001/0028474 A1* | 10/2001 | Parulski et al. | 358/1.16 |
| 2004/0201613 A1* | 10/2004 | Simpson et al. | 345/738 |
| 2004/0207869 A1* | 10/2004 | Endo | 358/1.15 |
| 2005/0221856 A1* | 10/2005 | Hirano et al. | 455/557 |
| 2005/0254089 A1* | 11/2005 | Oliver et al. | 358/1.16 |
| 2005/0277405 A1* | 12/2005 | Noguchi | 455/411 |
| 2006/0023237 A1* | 2/2006 | Endo | 358/1.13 |
| 2008/0056696 A1* | 3/2008 | Wun | 396/56 |
| 2009/0244625 A1* | 10/2009 | Hasegawa et al. | 358/1.17 |
| 2009/0245643 A1* | 10/2009 | Hasegawa et al. | 382/181 |
| 2009/0249200 A1* | 10/2009 | Hasegawa et al. | 715/273 |

FOREIGN PATENT DOCUMENTS

| | | |
|---|---|---|
| GB | 2 362 011 | 11/2001 |
| JP | 11-194903 A | 7/1999 |
| JP | 2003167695 | 6/2003 |
| JP | 2004-157834 A | 6/2004 |
| JP | 2004-229211 A | 8/2004 |
| JP | 2005-117527 A | 4/2005 |
| JP | 2006-238145 A | 9/2006 |
| JP | 2006-285331 A | 10/2006 |
| JP | 2006-343877 A | 12/2006 |

* cited by examiner

*Primary Examiner* — Satwant Singh
(74) *Attorney, Agent, or Firm* — McCarter & English, LLP

(57) ABSTRACT

A printing system includes a portable unit terminal, a server connected through a network to the portable unit terminal, and a printer capable of printing print data, which are received from the portable unit terminal. The portable unit terminal includes an image-acquiring device; an input device; a text-data-transmitting device that transmits text data to the server; a layout-data-receiving device that receives layout data sent from the server; a print-data-producing device that places image data acquired by the image-acquiring device in accordance with layout data received by the layout-data-receiving device; and a print-data-transmitting device that sends print data to the printer. The server includes a template-storage device that stores a template used for printing image data and text data by the printer; a text-data-receiving device; a layout-data-producing device that inserts the text data received by the text-data-receiving device into a stored template to produce layout data; and a layout-data-transmitting device.

3 Claims, 12 Drawing Sheets

"AICHI MIZUHO", ~202

"MARCH 20TH, 2007" ~203

"2,500 YEN ¥n 3,000 YEN ¥n 2,000 YEN ¥n 900 YEN ¥n 8,400 YEN ¥n 420 YEN ¥n 8,820 YEN", ~204

"PRINTER ABCD-E3000 Z4321", ~205

"THE PRINTER DOES NOT START UP EVEN THOUGH POWER IS SUPPLIED. AFTER POWER IS TURNED ON, ~206
THE PRINTER GENERATES NOISE AND ENDS OPERATION."

"FAILURE OF A PART IN THE MAIN BODY IS OBSERVED, AND THIS PART (RZ-3371) IS REPLACED." ~207

"PICTURE_1.BMP" ~208

WORK REPORT AND DELIVERY STATEMENT

OOXX CORPORATION
ZIP CODE: XXX-XXXX
ADDRESS: OO CITY, OO WARD, OO TOWN, OO STREET
TELEPHONE NUMBER: XXX-XXX-XXXX

TRAVEL EXPENSES:
TECHNICAL FEE:
SERVICE CHARGE:
PART PRICE:
SUBTOTAL:
CONSUMPTION TAX:

TOTAL:

DEAR _____,
I REPORT THE WORK AS FOLLOWS:

PRODUCT:

SYMPTOMS:

ACTIONS TAKEN:

INTERNAL PARTS OF THE PRINTER ARE CLEANED.
AREA AROUND THE PRINTER IS CLEARED.
TAKE CARE TO KEEP THE ENVIRONMENT
OF THE PRINTER CLEAN.

PERSON CUSTOMER CENTER    IF THE ABOVE MENTIONED PART BREAKS DOWN WITHIN A YEAR,
IN CHARGE: NAGOYA TARO    WE WILL DO REPAIR WORK FREE OF CHARGE.
                          IN SUCH A CASE, PLEASE PRESENT THIS REPORT
                          TO THE PERSON IN CHARGE OF THIS PROBLEM.

PRINTING SYSTEM, PORTABLE UNIT TERMINAL, SERVER, PORTABLE EMBEDDED PROGRAM AND SERVER PROGRAM

CROSS-REFERENCE TO RELATED APPLICATION

This Application claims priority from Japanese Patent Application No. 2007-74154, filed Mar. 22, 2007, the disclosure of which is hereby incorporated by reference in its entirety.

BACKGROUND

The present disclosure relates to a printing system, a portable unit terminal, a server, a portable embedded program and a server program. In particular, the present disclosure relates to a printing system in which text data are sent from a portable unit terminal to a server, layout data including the text data are produced at the server and are returned to the portable unit terminal, and images are placed in accordance with the layout data at the portable unit terminal and are printed by a printer.

In recent years, portable unit terminals capable of data communication have become widespread, and data communication by portable unit terminals through networks has also become popular. For example, people download musical, lyrical and photographic data to their portable unit terminals from servers, for enjoyment. In such a case, a user may desire to download musical score data or high-resolution photographic data. However, such data are often too large to be downloaded to a portable unit terminal. To circumvent this problem, there has been a proposal for a system that uses a printer additionally connected to the server through the network, wherein the portable unit terminal instructs the system for printing the musical score or the high-resolution photograph (refer, for example, to Japanese Laid-Open Patent Publication No. 2003-167695).

At on-site repair services on household electrical appliances on site, a repairman inputs a repair report with a portable unit terminal and sends it through networks to a server, which registers the repair report. Furthermore, if necessary, the repairman can make an additional report according to the contents of the report he sent to the server, and he can print it and hand it to the client on the spot.

In such a case, it is preferable that the repairman takes an on-site picture, registers it with the server, and print it. However, image data for a photograph generally take a large data volume, so sending and receiving image data by a portable unit terminal is often not suitable. In addition, it is difficult for the above mentioned system to send image data from the server to the printer for printing an image since the system requires the image data to be sent from the portable unit terminal to the server, at first.

SUMMARY

This disclosure is done for solving the above problem, and it is an object of the present invention to provide a printing system, a portable unit terminal and a server that are capable of producing print data which include an image, without sending and receiving image data.

According to the present disclosure, there is provided a printing system that includes a portable unit terminal, a server connected through a network to the portable unit terminal, and a printer capable of printing print data, which are received from the portable unit terminal. The portable unit terminal includes an image-acquiring device that acquires image data, an input device that inputs characters and symbols, a text-data-transmitting device that transmits text data, which includes characters and symbols input by the input device, to the server, a layout-data-receiving device that receives layout data for printing, which layout data are sent from the server, a print-data-producing device that places image data acquired by the image-acquiring device in accordance with layout data received by the layout-data-receiving device, to produce print data, and a print-data-transmitting device that sends print data produced by the print-data-producing device, to the printer. The server includes a template-storage device that stores a template, which is layout information used for printing image data and text data by the printer, a text-data-receiving device that receives text data from the portable unit terminal, a layout-data-producing device that inserts the text data received by the text-data-receiving device into a template stored in the template-storage device to produce layout data, and a layout-data-transmitting device that transmits the layout data produced by the layout-data-producing device to the portable unit terminal. The printer includes a print-controlling device that executes printing operation in accordance with print data sent from the portable unit terminal.

In addition, according to the present disclosure, there is provided a portable unit terminal that is capable of connecting to a server, which stores a template, i.e., layout information used for printing, and produces, from the template, layout data to be used for printing, and is capable of connecting to a printer, which executes printing. The portable unit terminal that includes an image-acquiring device that acquires image data, an input device that inputs characters and symbols, a text-data-transmitting device that transmits text data, which comprise characters and symbols input by the input device, to the server, a layout-data-receiving device that receives layout data for printing, which layout data are sent from the server, a print-data-producing device that places image data acquired by the image-acquiring device, in accordance with the layout data received by the layout-data-receiving device, to produce print data, and a print-data-transmitting device that transmits print data produced by the print-data-producing device, to the printer.

In addition, according to the present disclosure, there is provided a server that is capable of connecting to a portable unit terminal. The server that includes a template-storage device that stores a template, which is layout information used by a printer for printing image data and text data, a text-data-receiving device that receives text data from the portable unit terminal, a layout-data-producing device that inserts the text data received by the text-data-receiving device into a template stored in the template-storage device to produce layout data, and a layout-data-transmitting device that transmits layout data produced by the layout-data-producing device to the portable unit terminal.

According to the present disclosure, there is provided a program recorded on a computer-readable record medium, which is used with a portable unit terminal capable of connecting to a server that stores a template, which is layout information used for printing, and that produces, from the template, layout data for printing, and capable of connecting to a printer, which executes printing. The program that includes instructions that cause a controller of the portable unit terminal to perform an image-acquiring step of acquiring image data, an inputting step of inputting characters and symbols, a text-data-transmitting step of transmitting text data, which comprise characters and symbols input at the inputting step, to the server, a layout-data-receiving step of receiving layout data for printing, which layout data are sent from the server, a print-data-producing step of placing image data acquired at the image-acquiring step, in accordance with the layout data received at the layout-data-receiving step, to produce print data, and a print-data-transmitting step of sending print data produced at the print-data-producing step, to the printer.

According to the present disclosure, there is provided a program recorded on a computer-readable record medium, which is used with a server capable of connecting to a portable unit terminal. The program that includes instructions that cause a controller of the server to perform a text-data-receiving step of receiving text data from the portable unit terminal, a layout-data-producing step of inserting the text data received at the text-data-receiving step into a template stored in a template-storage device, which template is layout information used by a printer for printing image data and text data, to produce layout data, and a layout-data-transmitting step of sending layout data produced at the layout-data-producing step to the portable unit terminal.

BRIEF DESCRIPTION OF THE DRAWINGS

Exemplary embodiments will be described below in detail with reference to the accompanying drawings in which:

FIG. 6 is an illustration showing an example of text data, which is sent from the portable unit terminal to the server.

FIG. 11 is an illustration showing an example of background image.

DETAILED DESCRIPTION OF THE EXEMPLARY EMBODIMENTS

Figure 1:
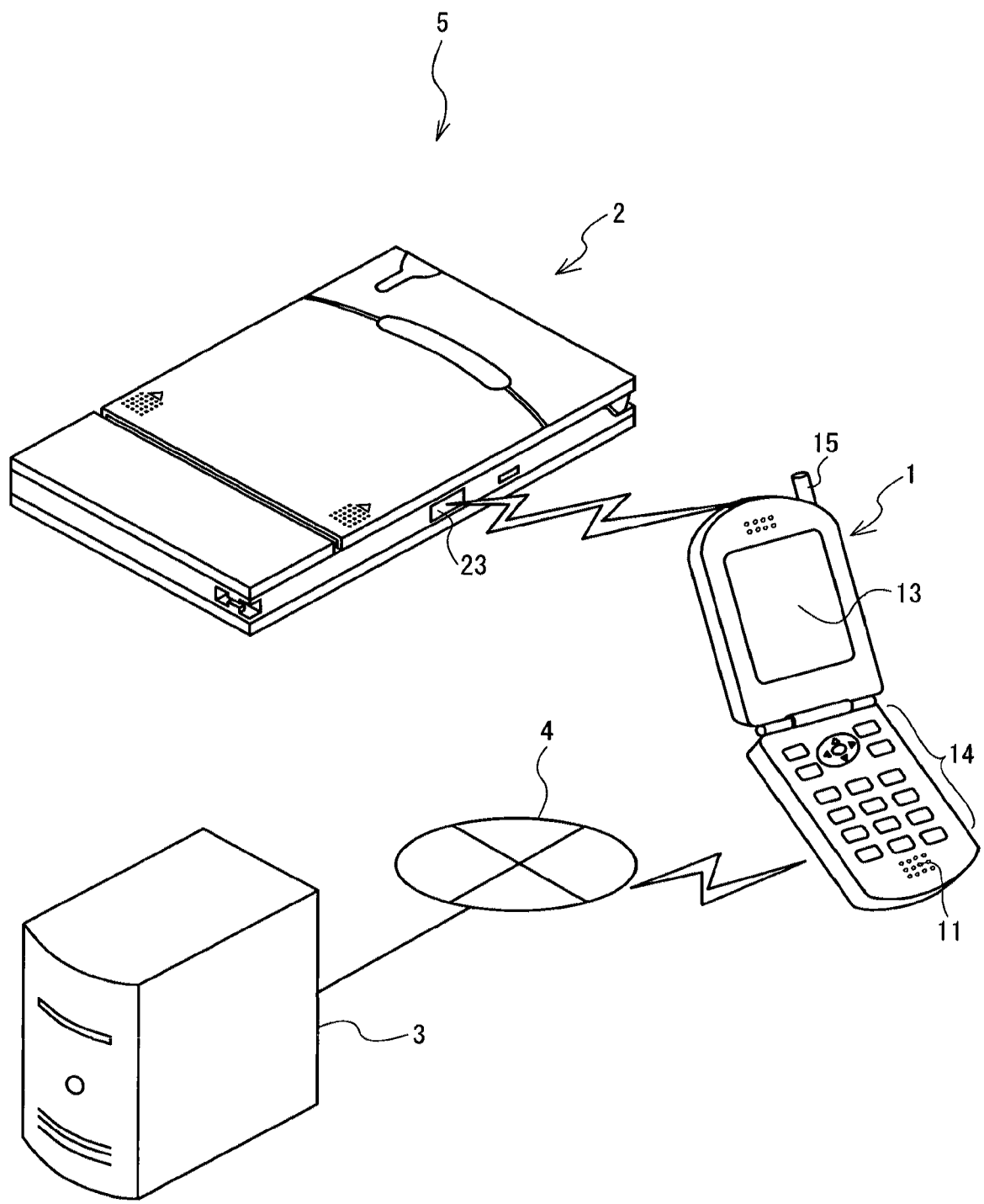
FIG. 1 is a schematic diagram showing the outline of a printing system.

An exemplary embodiment of a printing system according to the present disclosure with reference to the drawings is described below. At first, the outline of a printing system 5, which embodies the present disclosure, is described in reference to FIG. 1. As shown in FIG. 1, the printing system 5 includes a portable unit terminal 1, a printer 2 and a server 3.

Figure 2:
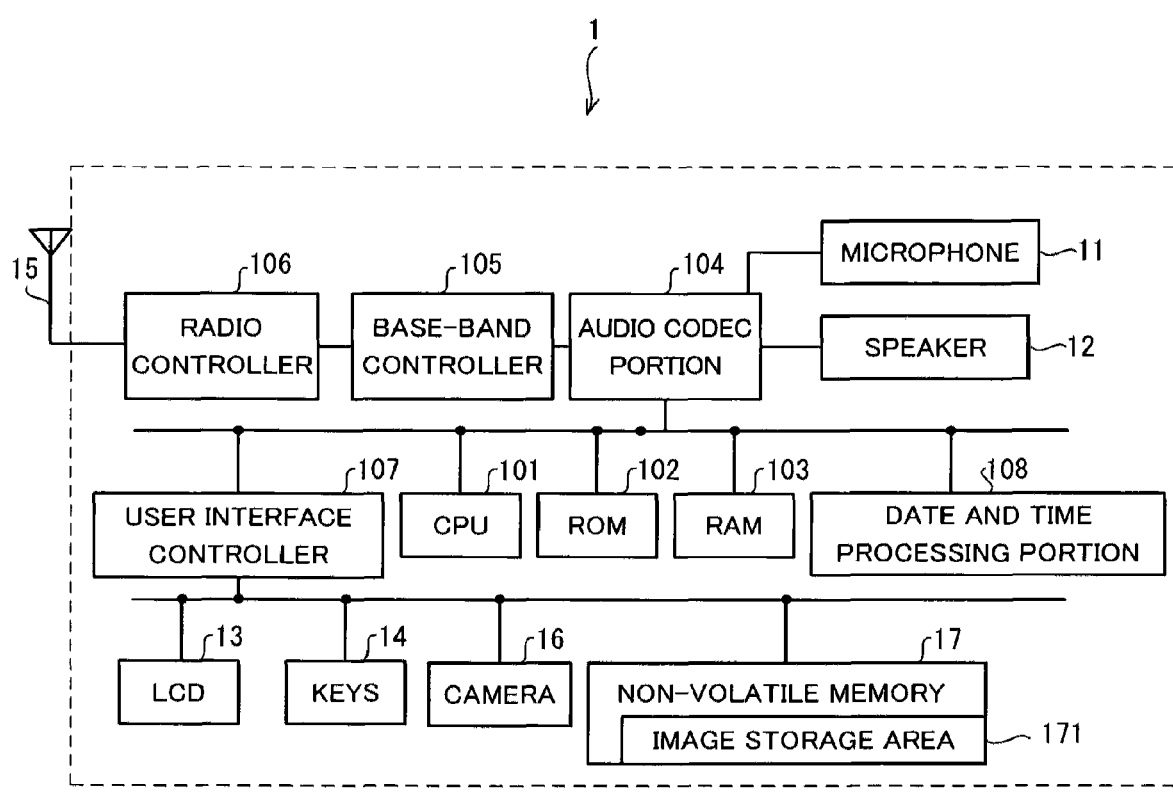
FIG. 2 is a block diagram showing an electrical configuration of a portable unit terminal.

The portable unit terminal 1 is a well-known mobile phone with a built-in camera. The portable unit terminal 1 includes at least a liquid crystal display (LCD) 13, keys 14 for inputting text data such as letters and numbers, an antenna 15 and a camera 16 (as shown in FIG. 2). One of the keys 14 is assigned as PHOTO key for the camera 16. The printer 2 is a small printer, for example, in size A6, which is convenient for carrying. The printer 2 receives print data from the portable unit terminal 1 through infra-red communication and prints the data. As described later in detail, the server 3 receives data from the portable unit terminal 1, registers the data and, by inserting the data into a template, produces layout data and sends the layout data to the portable unit terminal 1. The portable unit terminal 1 and the server 3 are connected through a network 4 such as the Internet, and the portable unit terminal 1 and the printer 2 are connected through infra-red communication. The portable unit terminal of the present disclosure is not limited to portable telephones, so it may be, for example, a PDA or a handheld computer, which is portable and capable of establishing communication with the server 3 and capable sending print data to the printer 2. Also, the printer 2 is not limited to small portable printers. It may be any device that has printing function and is capable of receiving print data from the portable unit terminal 1 and of printing the received data, and it may be in any size.

For example, a repairman, who has been dispatched from a company for repairing a household electrical appliance or an office machine, enters text data as a work report by using the portable unit terminal 1 on the spot and sends the text data to the server 3. Additionally, he can take a picture of the site on the spot with the camera 16 of the portable unit terminal 1 and can store its image data in the portable unit terminal 1. The server 3 registers the received contents with a database, retrieves a layout template for printing the work report from the database, inserts the received text data to produce layout data, and sends the layout data to the portable unit terminal 1. The repairman operating the portable unit terminal 1 places the photo image in a section specified in the received layout data to produce print data and sends the print data to the printer 2. The printer 2 prints the work report (as shown to FIG. 12) according to the received print data.

Figure 3:
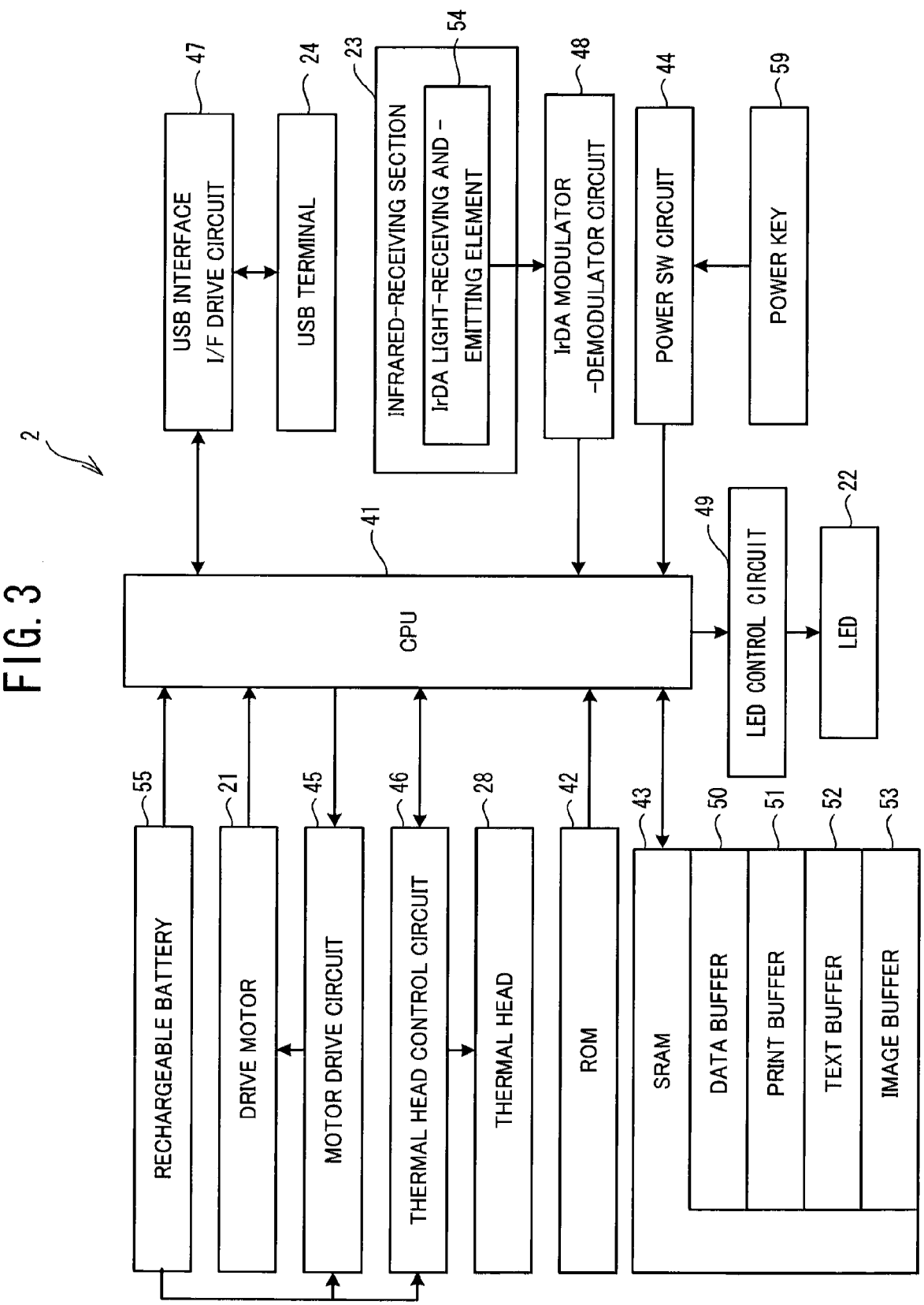
FIG. 3 is a block diagram showing an electrical configuration of a printer.
Figure 4:
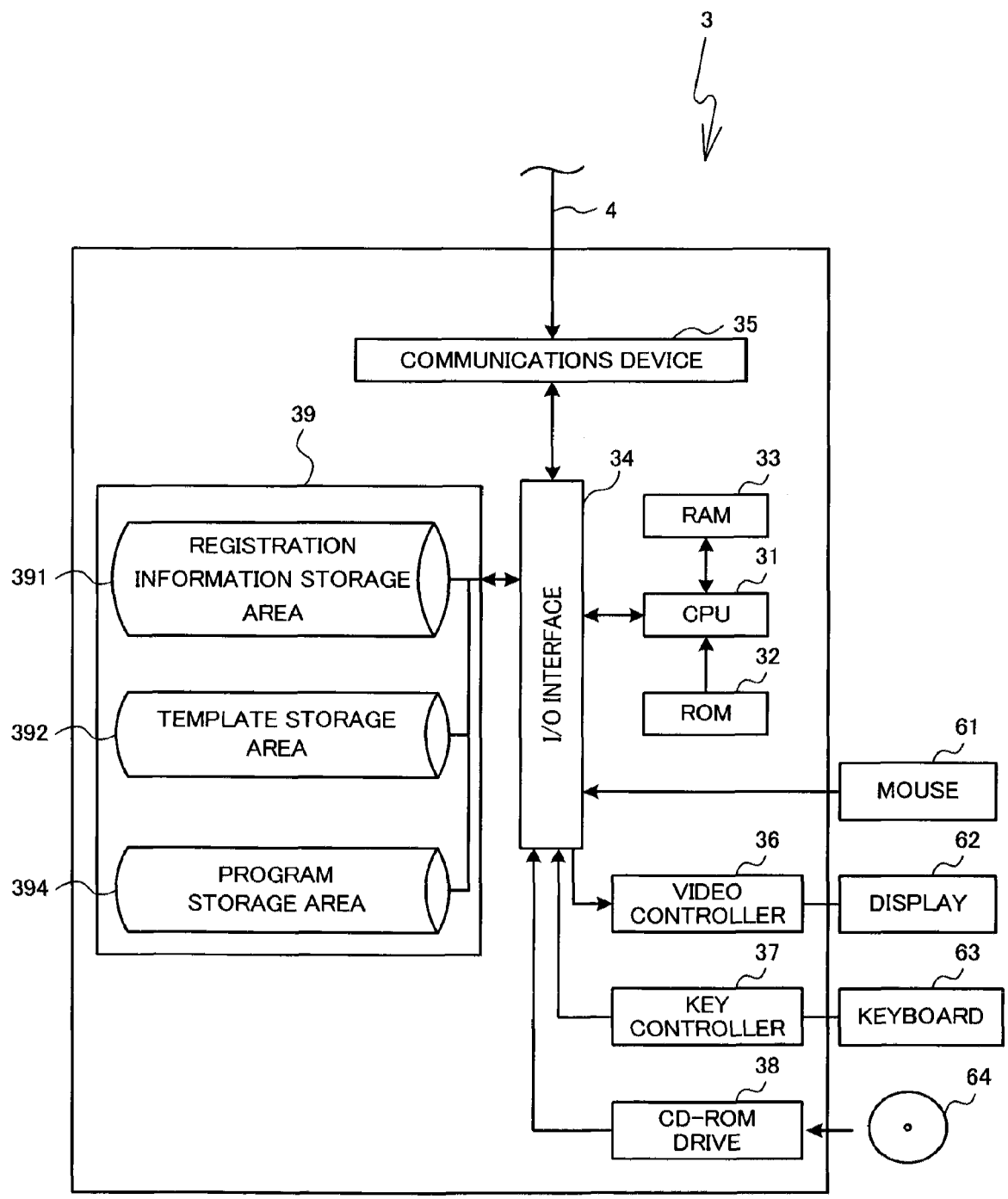
FIG. 4 is a block diagram showing an electrical configuration of a server.

Now, the construction of each component that constitutes the printing system 5 is described in reference to FIG. 2-FIG. 4. As shown in FIG. 2, the portable unit terminal 1 includes a CPU 101, a ROM 102 and a RAM 103. The CPU 101 controls the overall action of the portable unit terminal 1. The ROM 102 stores a program and a BIOS executed by the CPU 101, including a program for making the portable unit terminal 1 to function as portable unit terminal of the present disclosure. The RAM 103 is used for storing various data temporarily. The portable unit terminal 1 further includes an audio codec portion 104, a base-band controller 105, a radio controller 106 and a user interface controller 107. The audio codec portion 104 digitizes audio signals input from a microphone 11 and converts digital audio data to analog signals, which are output from a speaker 12. The base-band controller 105 executes a procedure required by a communication protocol for transferring audio data processed by the audio codec portion 104. The radio controller 106 modulates signals to be transmitted through the radio antenna 15 and demodulates high frequency signals received through the radio antenna 15. The user interface controller 107 controls both inputs from the keys 14 and the camera 16 and outputs to the LCD 13 and also controls inputs and outputs from a non-volatile memory 17 including an image storage area 171. With this configuration, the portable unit terminal 1 provides voice phone function through radio communication as normal portable telephone and additionally provides functions of photographing and of storing and transmitting data.

As shown in FIG. 3, the printer 2 includes a CPU 41, a ROM 42, an SRAM 43, a power switch (SW) circuit 44, a motor drive circuit 45, a thermal head control circuit 46, a USB interface (I/F) drive circuit 47, an IrDA modulator-demodulator circuit 48, an LED control circuit 49, and a rechargeable battery 55, all of which are connected to the CPU 41. Furthermore, a drive motor 21 is connected to the motor drive circuit 45, a thermal head 28 is connected to the thermal head control circuit 46, and an LED 22 is connected to the LED control circuit 49.

The ROM 42 stores all the programs that the CPU 41 executes, and it also stores dot-pattern data of a number of characters, which are used in printing, in correspondence to their code data. The SRAM 43 stores temporary data, which are necessary for the processing of the CPU 41. The SRAM 43 includes a data buffer 50, where input data are placed, a print buffer 51, where data to be printed are presented, a text buffer 52, where the text data included in the print data are placed temporarily, and an image buffer 53, where the image data included in the print data are placed temporarily.

The motor drive circuit 45 controls the drive motor 21. The thermal head control circuit 46 controls the heating unit of the thermal head 28. The power switch (SW) circuit 44 is a circuit that is connected to a power key 59 and that turns ON/OFF the electric power supply of the printer 2. The LED control circuit 49 is a circuit that controls the light emitting state of the LED 22.

The USB I/F drive circuit 47, which is connected to the CPU 41, is an interface circuit that executes USB protocol communication with the portable unit terminal 1 and an external device like a PC, and to this circuit, a USB terminal 24 is connected. The IrDA modulator-demodulator circuit 48, which is connected to the CPU 41, is an interface circuit that executes IrDA standard communication with the portable unit terminal 1 or an external device, for example, a PDA that has a unit to enable data transmission over infrared light. The IrDA modulator-demodulator circuit 48 is connected to an IrDA light-receiving and -emitting element 54 provided in an infrared-receiving section 23, which element enables the printer 2 to communicate over infrared light.

The rechargeable battery 55, which is an internal power source of the printer 2, supplies electrical power to the CPU 41, to the motor drive circuit 45, and to the thermal head control circuit 46. The motor drive circuit 45, which is connected to the CPU 41, operates the drive motor 21 for feeding print paper in response to a command from the CPU 41. Also, the thermal head control circuit 46, which is connected to the CPU 41, drives the thermal head 28 for thermal printing in response to a command from the CPU 41.

Now, the server 3 is described with reference to FIG. 4. The server 3 is a well-known general purpose computer, which includes a CPU 31 for controlling the operation of the server 3. The CPU 31 is connected through a bus to a ROM 32, where an OS is stored, to a RAM 33, where various data are stored temporarily, and to an I/O interface 34, which controls input and output. The I/O interface 34 is connected to a hard disk drive 39, which stores a variety of information, to a key controller 37, which controls a keyboard 63 to accept inputs by the user, to a mouse 61, to a video controller 36, which controls a display 62 for screen display, to a CD-ROM drive 38, which reads a CD-ROM 64, and to a communications device 35, which is connected to the network 4. The hard disk drive 39 includes a registration information storage area 391, a template storage area 392, a program storage area 393, and another storage area, which is not shown in the drawing. The registration information storage area 391 is used for storing a registration information database (DB), which is the database where the text data sent from the portable unit terminal 1 are registered. The template storage area 392 is used for storing layout templates, which are layout information for inserting text data to produce layout data. The program storage area 393 is used for storing various programs, which the server 3 executes.

Figure 5:
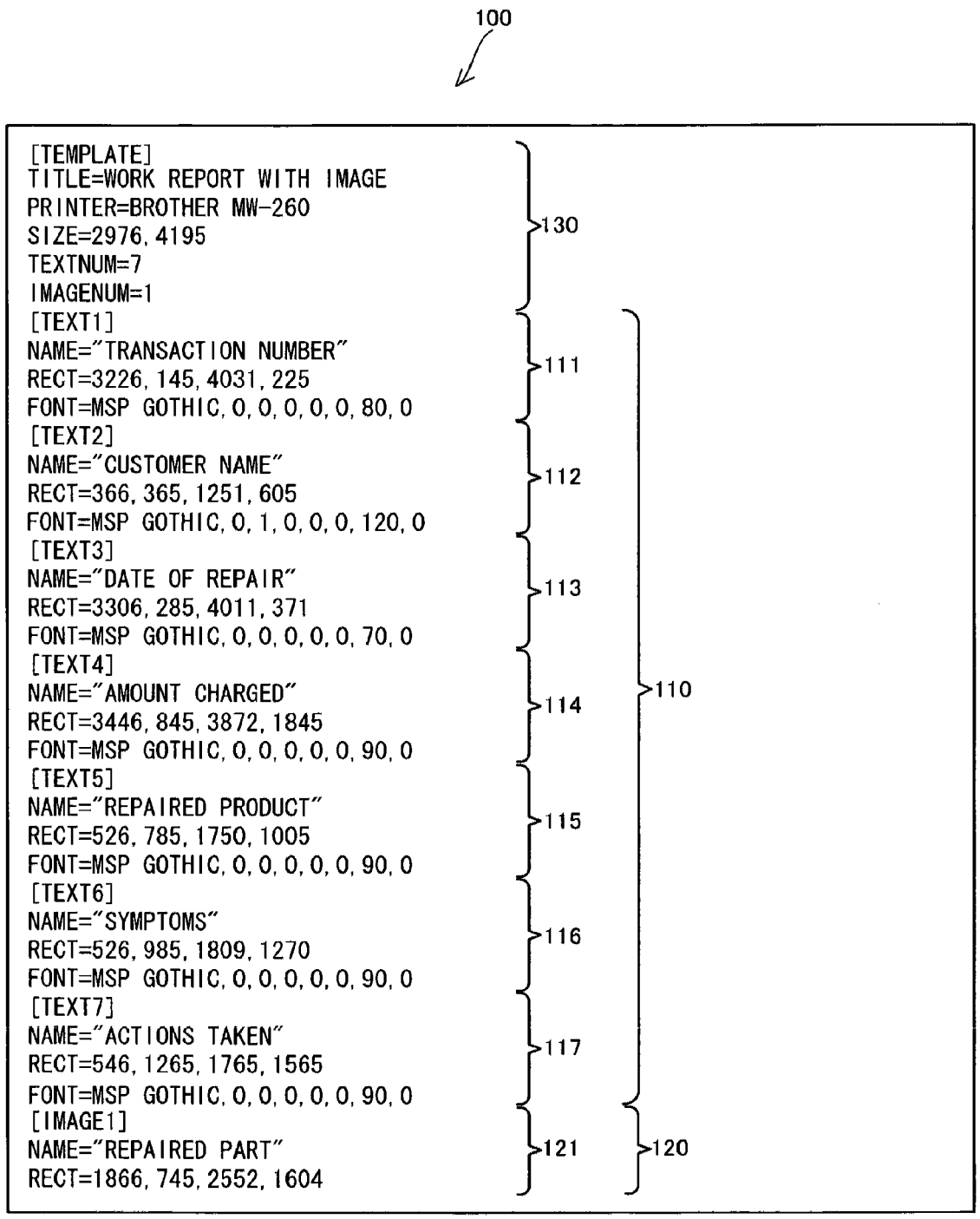
FIG. 5 is an illustration showing an example of template, which is stored in a template storage area of the server.
Figure 7:
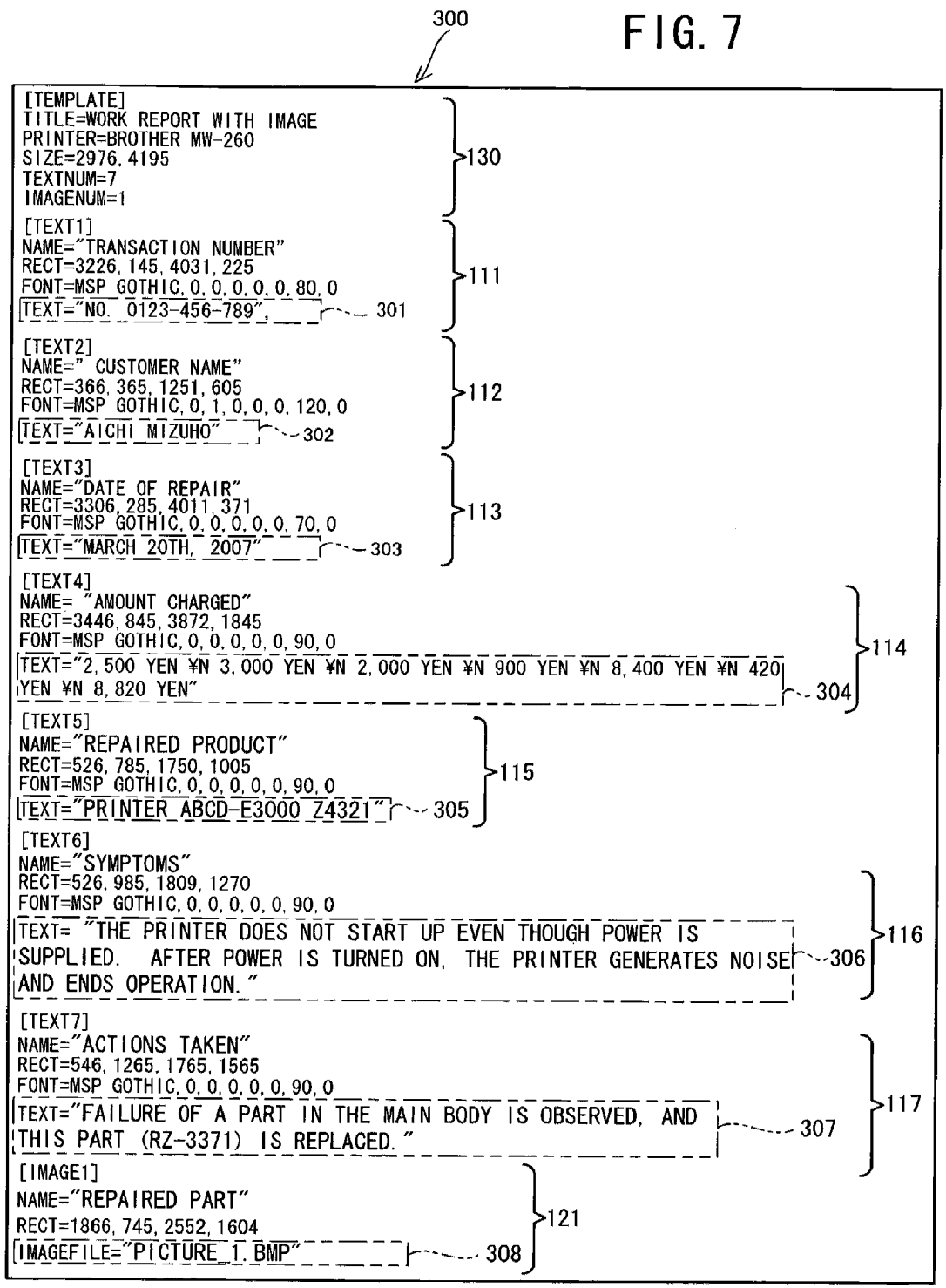
FIG. 7 is an illustration showing an example of layout data, which is produced by the server and sent to the portable unit terminal.

Now, the layout template, which is stored in the server 3, text data, which are sent from the portable unit terminal 1 to the server, and layout data, which are compiled from the layout template and text data, are described in reference to FIG. 5-FIG. 7.

As shown in FIG. 5, the layout template 100 comprises text data. The text data 200 received from the portable unit terminal 1 are inserted in specified blanks sequentially of the layout template 100. The layout template 100 comprises mainly three parts, which are a template information part 130, a text block part 110, and an image block part 120. The template information part 130 keeps template name, model name of the printer 2, to which print data are sent, total size, number of text items to be inserted, and number of image data to be inserted. The text block part 110 holds text blocks 111-117, the number of which corresponds to the number of text items specified in the template information part 130. The image block part 120 holds an image block 121, the number of which corresponds to the number of image data specified in the template information part 130. Each text block 111-117 includes text block name, layout position and size for the text block, and type of font to be used. The image block 121 includes image block name, and layout position and size for the image block. In the example shown in FIG. 5, the block name of text block 111 is "transaction number", the block name of text block 112 is "customer name", the block name of text block 113 is "date of repair", the block name of text block 114 is "amount charged", the block name of text block 115 is "repaired product", the block name of text block 116 is "symptoms", the block name of text block 117 is "actions taken", and the block name of image block 121 is "repaired part".

The text data 200, which are input with the portable unit terminal 1 and sent to the server 3, correspond to each text block 111-117 in the layout template 100. When the portable unit terminal 1 is used for data input, the text block name displayed on the LCD 13 prompts the user to input appropriate data. In other words, as show in FIG. 6, the user keys in text strings appropriate for the following respective items: transaction number 201, customer name 202, date of repair 203, amount charged 204, repaired product 205, symptoms 206, actions taken 207, and repaired part 208. Then, the user sends the input data. As the text for item repaired part 208, the user keys in the file name ("photograph 1.bmp" in the example of FIG. 6) of the image data that is to be placed into image block 121.

At the server 3, the text data 200, which are received from the portable unit terminal 1, are inserted into the layout template 100 to produce layout data 300 as shown in FIG. 7. It should be understood by comparing the layout template 100 in FIG. 5 with the layout data 300 in FIG. 7 that the received text data 201-207 (as shown in FIG. 6) are inserted into the corresponding text blocks 111-117, respectively, filling in text data fields 301-307. The text data 208 indicating the file name of the image data are inserted into image block 121 as image file name 308.

Figure 8:
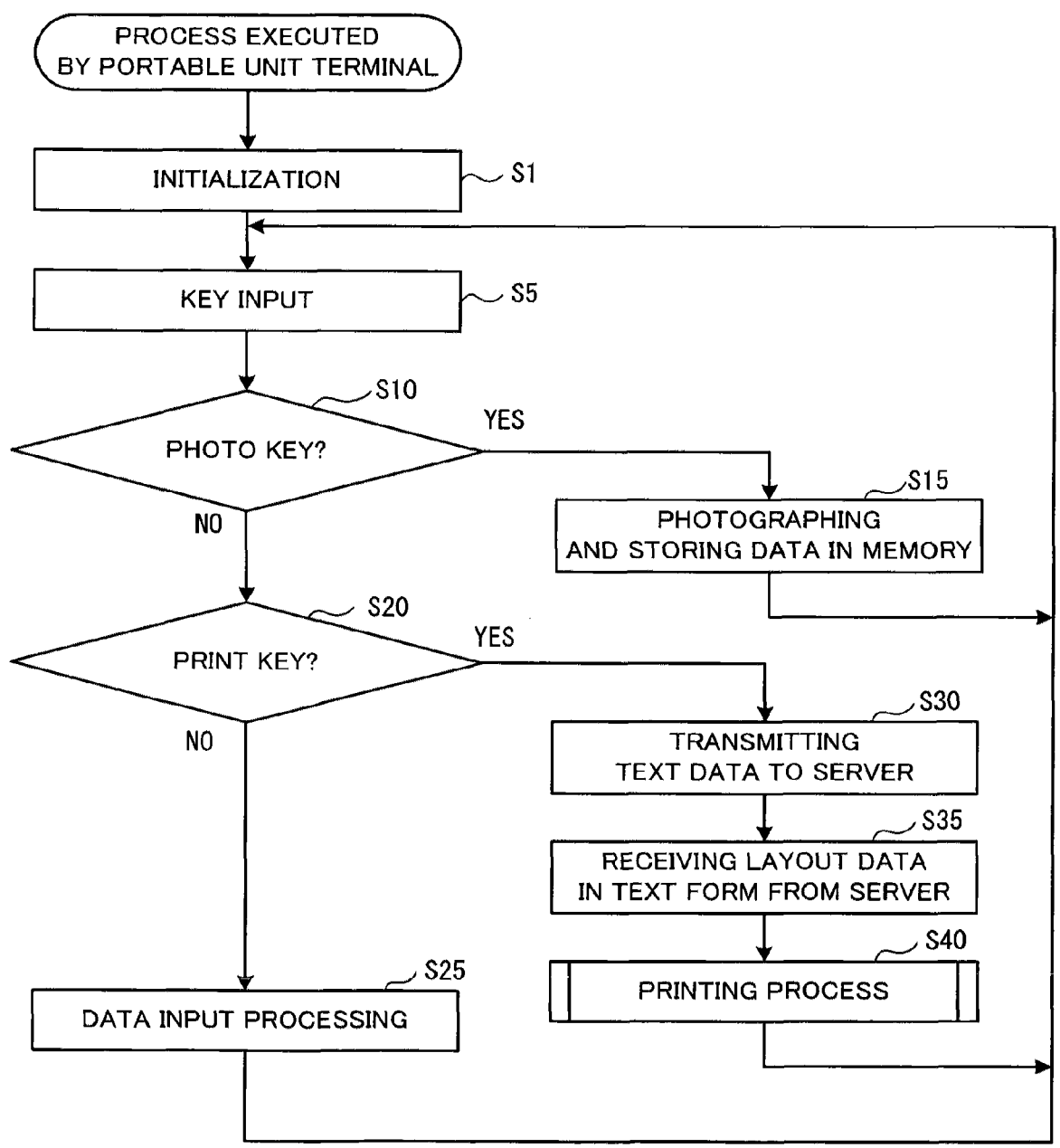
FIG. 8 is a flowchart of a process executed by the portable unit terminal.

Now, the operation of the printing system, which has the above-mentioned configuration, is described in reference to FIG. 8-FIG. 12. When the portable unit terminal 1 is switched on, the process illustrated in FIG. 8 is started according to a program stored in the ROM 102. This process is repeated until the portable unit terminal is switched off.

In the process, at first, an initialization step is executed to clear all the storage areas of the RAM 103 and to set various kinds of parameters to default values (S1). Next, various inputs from the keys 14 are accepted (S5). If the pressed key is PHOTO key for the camera 16 (Yes at S10), then a picture is taken by the camera 16, and the image data are stored in the image storage area of the non-volatile memory 17 (S15). Then, the process returns to S5, so key inputs are accepted again.

If the pressed key is not PHOTO key (No at S10), then a determination is made as to whether it is PRINT key (S20). If it is not PRINT key (No at S20), then it is an input of a character or a symbol, so data input is processed (S25). Then, the process returns to S5. Here, as mentioned above, the item names of the predetermined items are displayed one by one sequentially, prompting the user to input information appropriate for each concerned item. In other words, the user keys in text strings in the predetermined order for items transaction number 201, customer name 202, date of repair 203, amount charged 204, repaired product 205, symptoms 206, actions taken 207, and repaired part 208. Then, the input data are stored in the RAM 103.

If the pressed key is PRINT key (Yes at S20), then the text data 200, which are stored in the RAM 103, are sent to the server 3 (S30). In other words, the text data 200 shown in FIG. 6 are sent to the server 3. As a result, at the server 3, the received text data are inserted for producing layout data 300 (as shown in FIG. 7) as described later. Then, the portable unit terminal 1, in turn, receives the layout data 300 (S35). Next, the layout data 300 are used to produce print data, and the print data are sent to the printer 2, which executes printing (S40). Then, the process returns to S5.

Figure 9:
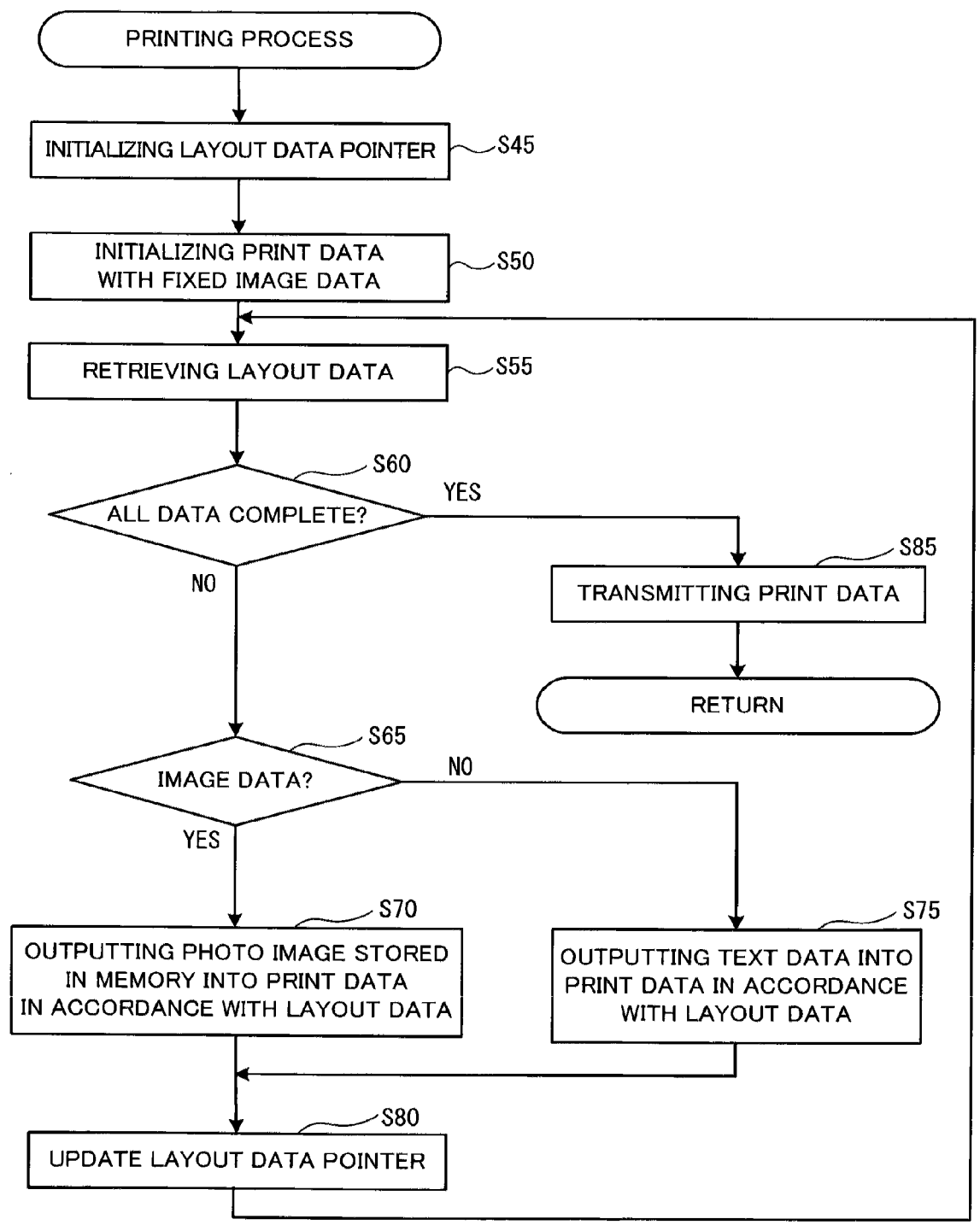
FIG. 9 is a flowchart of a printing process, which is executed by the portable unit terminal.

Now, the details of the printing process executed at S40 are described in reference to FIG. 9. When the printing process starts, at first, layout data pointer is initialized (S45). The layout data pointer is a pointer that indicates a block to be processed currently, of text blocks 111-117 and image block 121 (as shown in FIG. 7).

Next, if a fixed background image is to be used, then print data is initialized by attaching with the fixed background image (S50). If there is a form, which is to be printed commonly to all work reports, like the one shown in FIG. 11, then such a form may be stored as a fixed background image in the non-volatile memory 17 of the portable unit terminal 1 and be used.

Then, the layout data pointed by the layout data pointer are retrieved (S55). If there are still remaining layout data in the location where the pointer points (No at S60), then a determination is made as to whether these layout data are for an image block that defines a layout of image data (S65). If the remaining layout data are for image data (Yes at S65), then the image stored in the image storage area 171 of the non-volatile memory 17 is retrieved, and the size and position of the image are adjusted in correspondence to the layout data, and the image is output into print data (S70). The layout data pointer is updated for processing the next block (S80), and the process returns to S55, where the next layout data pointed by the pointer are retrieved.

Figure 12:
FIG. 12 is an illustration showing an example of output result, which is printed according to the layout data.

On the other hand, if the layout data pointed by the layout data pointer does not indicate image data (No at S65), then the text data in the location pointed by the pointer are made into the print data in the font and at the layout position specified by the layout data (S75). Then, the layout data pointer is updated (S80), and the process returns to S55. Next, the layout data pointed currently by the pointer are retrieved. If no more data are available at the location pointed by the pointer (Yes at S60), then the print data compiled so far are sent to the printer 2 (S85), where printing is carried out to produce a work report (as shown in FIG. 12). Then, the process returns to the main routine shown in FIG. 8.

Figure 10:
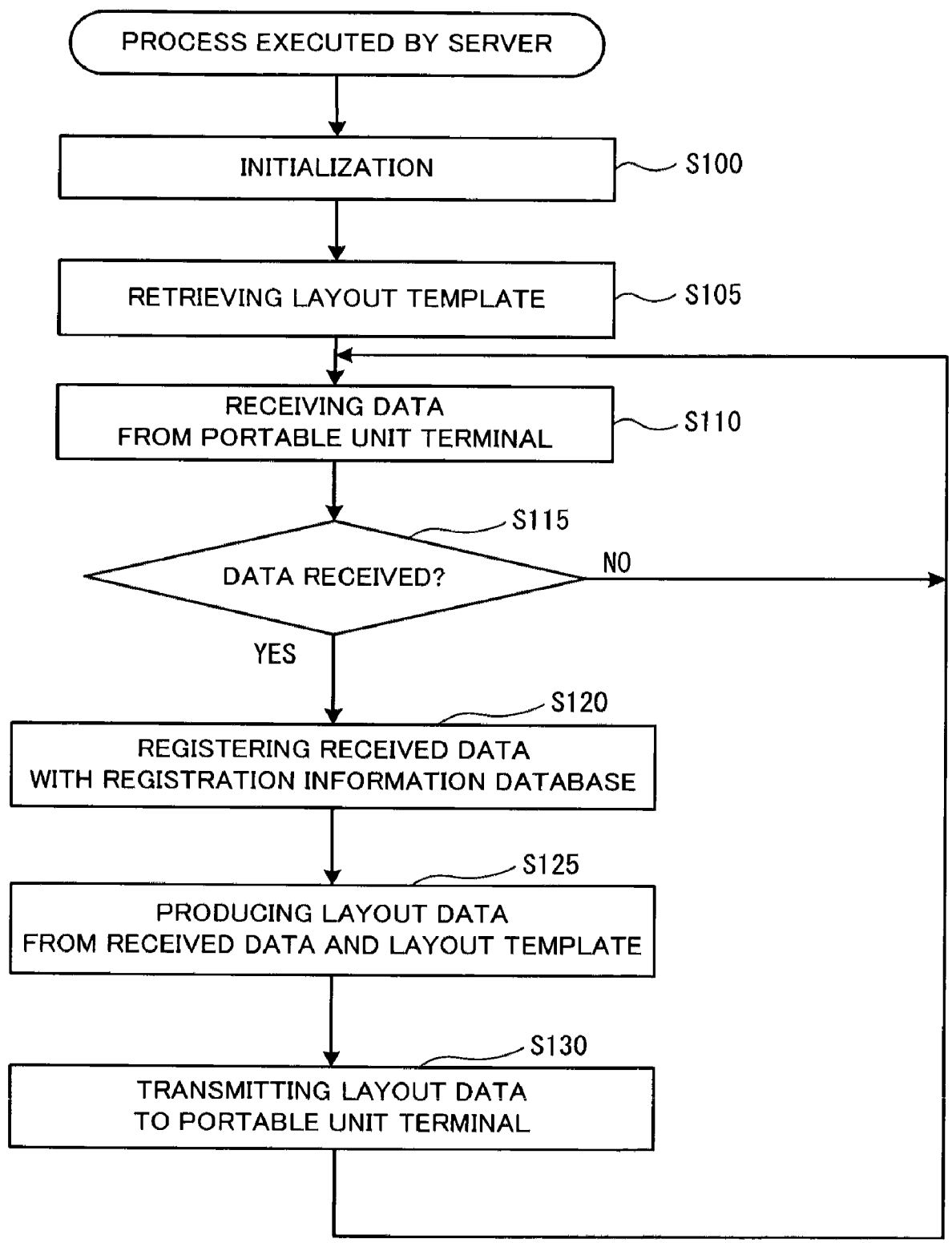
FIG. 10 is a flowchart of a process executed by the server.

Now, the process executed at the server 3 is described in reference to FIG. 10. When the server 3 is powered on, the process shown in the FIG. 10 starts. This process is repeated until the power is switched off. At first, various initialization steps are executed (S100), and then, a layout template stored in the template storage area 392 is read into the RAM 33 (S105).

Now, the server waits for a data sending from the portable unit terminal 1 (S110). If there is no data reception (No at S115), the process returns to S110, waiting for data reception. If there is data reception (Yes at S115), then the contents of the received text data 200 are registered with the registration information database, which is stored in the registration information storage area 391 (S120). The received text data 200 and the layout template 100 retrieved at S105 are used to produce layout data 300 (as shown in FIG. 7).

The layout data 300, which are produced as described above, are sent to the portable unit terminal 1. Then, the process returns to S110, waiting for next data reception.

As described above, in the printing system 5 of this embodiment, the portable unit terminal 1 takes a picture and store it as image data, and the portable unit terminal 1 also inputs text of necessary information and sends the text data to the server 3. The server 3 prepares layout data and sends them to the portable unit terminal 1. The portable unit terminal 1, after it has received the layout data, places the text data and the image data stored in the portable unit terminal 1 in accordance with the layout data to produce print data. The portable unit terminal 1 sends the print data to the printer 2 for printing. Because these layout data sent from the server 3 also take a form of text data, the transmission of the data does not require as much communications load and cost as transmission of image data. According to the system, a common layout can be used for printing a report, which may include an image. If texts that should be registered at the server 3 are used as input items and embedded in the layout data, then both registration with the database and preparation of the print layout can be carried out at the same time. Furthermore, because it is not necessary to keep the layout data in the portable unit terminal 1, the layout can be modified at the server 3, if necessary.

The configuration of the printing system 5, which is described in the above-mentioned embodiment, is only an example. It is clear that various modifications are possible.

What is claimed is:

1. A printing system
comprising
a portable terminal unit; a server connected through a network to the portable terminal unit; and a printer capable of printing print data, which are received from the portable terminal unit, wherein
the portable terminal unit includes:
a photo-taking device that takes a photo and generates photo-image data as an output;
an image-acquiring device that acquires the photo-image data generated by the photo-taking device, as image data;
an image-storage device that stores the image data acquired by the image-acquiring device;
an input device that inputs character and symbol data;
a text-data-transmitting device that transmits text data, which comprise characters and symbols input by the input device, to the server;
a layout-data-receiving device that receives layout data for printing, which layout data are sent from the server;
wherein said layout data includes image arrangement information, the image arrangement information being information for a position of the image data stored in the image storing device on the print date;
and a print-data-producing device that places image data stored in the image-storing device in accordance with the image arrangement information included in the layout data received by the layout-data-receiving device, to produce print data; and a print-data-transmitting device that transmits print data produced by the print-data-producing device, to the printer;

the server includes:

a template-storage device that stores one or more templates of layout information used for printing the image data and the text data by the printer, the one or more templates including the image arrangement information;

a text-data-receiving device that receives text data from the portable terminal unit;

a layout-data-producing device that inserts text data received by the text-data-receiving device into a template stored in the template-storage device to produce layout data, and a layout-data-transmitting device that sends layout data produced by the layout-data-producing device to the portable unit terminal;

the printer includes a print-controlling device that executes a printing operation in accordance with print data sent from the portable terminal unit.

2. A portable terminal unit capable of connecting to a server and to a printer that executes printing, the server storing one or more templates of layout information used for printing, and producing, from the template, layout data, which are to be used for printing; comprising:

photo-taking device that takes a photo and generates photo-image data as an output;

an image-acquiring device that acquires the photo-image data generated by the photo-taking device, as image data;

an image-storage device that stores the image data acquired by the image-acquiring device;

an input device that inputs character and symbol data;

a text-data-transmitting device that transmits text data, which comprise characters and symbols input by the input device, to the server;

a layout-data-receiving device that receives layout data for printing, which layout data are sent from the server;

wherein said layout data includes image arrangement information, the image arrangement information being information for a position of the image data stored in the image storing device on the print date;

wherein the one or more templates include the image arrangement information;

a print-data-producing device that places image data stored in the image-storage in accordance with the image arrangement information included in the layout data received by the layout-data-receiving device to produce print data; and a print-data-transmitting device that sends print data produced by the print-data-producing device, to the printer.

3. A program recorded on non-transitory a computer-readable recording medium, which is used with a portable terminal unit capable of connecting to a server that stores one or more templates of layout information used for printing and that produces layout data for printing from the template, and the portable terminal unit capable of connecting also to a printer that executes printing; wherein the program comprising instructions that cause a controller of the portable terminal unit to perform:

a photo-taking step of taking a photo and generating photo-image data as output;

an image-acquiring step of acquiring photo-image data generated at the photo-taking step, as image data;

an image-storing step of storing the image data;

an image-acquiring step of acquiring image data;

an inputting step of inputting characters and symbols;

a text-data-transmitting step of transmitting text data, which comprise characters and symbols input at the inputting step, to the server;

a layout-data-receiving step of receiving layout data for printing, which layout data are sent from the server;

wherein said layout data includes image arrangement information the image arrangement information being information for a position of the image data stored in the image storing device on the print date; and wherein the one or more templates include the image arrangement information; and a print-data-producing step of placing image data stored at the image-storing step in accordance with the image arrangement information included in the layout data received at the layout-data-receiving step to produce print data and a print-data-transmitting step of transmitting print data produced at the print-data-producing step, to the printer.

* * * * *